3,548,057
TOPICAL ADMINISTRATION OF VITAMIN $B_{12}$
Kane L. Kelley, Roselle, and Idamae G. Trenner and Robert H. Silber, Westfield, N.J., assignors to Merck & Co., Inc., Rahway, N.J., a corporation of New Jersey
No Drawing. Filed Apr. 29, 1969, Ser. No. 827,463
Int. Cl. A61k 25/02
U.S. Cl. 424—201                                      2 Claims

ABSTRACT OF THE DISCLOSURE

Vitamin $B_{12}$ is administered to animals and humans by topical application in a methyl salicylate vehicle.

---

This invention is concerned with a method of administering vitamin $B_{12}$ to animals and humans.

Vitamin $B_{12}$ is very difficultly absorbed from the gastrointestinal tract in spite of the fact that of all the essential nutrients, it alone has a known specific mechanism to facilitate its absorption. It has been reported that the vitamin is absorbed sublingually and by nasal inhalation, but neither of these methods is being used for the administration of vitamin $B_{12}$. Generally, this vitamin is administered parenterally by subcutaneous or intramuscular injection.

It is one object of this invention to provide an improved method of administering vitamin $B_{12}$ to humans and animals which will avoid the difficulties and disadvantages of administering it by needle injection.

Another object is to provide a method of administering vitamin $B_{12}$ whereby the vitamin is absorbed and slowly released.

In accordance with this invention it is found that vitamin $B_{12}$ can be administered to animals and humans by applying topically a solution of the vitamin in methyl salicylate to the skin of the animal. The skin is found to act as a reservoir, absorbing large amounts of the vitamin and releasing it slowly to other tissues.

Methyl salicylate has been widely used for many years, formerly under the name of oil of wintergreen, for its counterirritant action in various liniments. Methyl salicylate is produced synthetically or is obtained by maceration from the leaves of *Gaultheria procumbeus* or from the bark of *Betula leuta*. It has been reported that it is impossible to distinguish between the synthetic and natural oil.

The vitamin $B_{12}$-methyl salicylate formulation can be applied topically to the skin or it may be further combined with suitable solvents, which are non-toxic and are miscible with methyl salicylate. Solvents suitable for this purpose include the following: ethanol, methanol, isopropyl alcohol, 2-octyl dodecanol, methyl pyrrolidone, squalene, squalane, isopar "M" (coparaffinate), isopropyl myristrate, acetulan (acetylated lanolin alcohols), polyethylene glycol, dimethylsulfoxide, diethyl phthalate, dimethylacetamide, polysorbate 80, diisopropyl adipate and mineral oil.

Mixtures of the above solvents may also be combined with the $B_{12}$-methyl salicylate combination. The concentration of the vitamin $B_{12}$ in the methyl salicylate is not critical and will depend, as one skilled in the art will appreciate, upon a variety of factors including the age, the body weight, the severity of the disorder being treated, etc. In general, it is found that compositions containing between about 100 gamma–1000 gamma of vitamin $B_{12}$ per ml. are satisfactory, although higher concentrations can be utilized if desired. It should be noted that it is highly desirable to add a trace amount of a substance such as ethanol or propanol to the vitamin $B_{12}$-methyl salicylate to assist in the solubilization of the vitamin. It will be appreciated that solubilization agents other than alcoholic materials may be used in this respect.

In carrying out the method of this invention, the solution of vitamin $B_{12}$ and methyl salicylate is applied to the skin, whereupon the vitamin $B_{12}$ is absorbed by the skin. The amount absorbed will vary somewhat, depending upon the particular animal or human and the area upon which the solution of the vitamin is applied. The vitamin absorbed by the skin is slowly released to other tissues of the body, the skin thus acting as a depot or reservoir for the vitamin $B_{12}$.

The following experiments carried out in dogs is presented to demonstrate the absorption of vitamin $B_{12}$ by topical applications of the vitamin in a methyl salicylate vehicle:

A 0.05% formulation of vitamin $B_{12}$-$Co^{57}$ is applied topically in an adult female dog in order to measure percutaneous absorption. The drug was formulated in a vehicle consisting of 10% DMSO, 20% methyl salicylate and 70% ethyl alcohol.

Radiometric measurements of urine, feces and several body tissues reveal that approximately 17.5% (359$\gamma$) of the total dose (2.05 mg.) applied had penetrated the skin during the 14 day experiment. Of the drug found in the excreta (341.3$\gamma$), approximately 83% was in the feces and 17% in the urine. Of the drug deposited in the tissues (approximately 18$\gamma$) at termination of the study, 64.5% was found in the liver, 16.3% in the intestines, 6.8% in the skin, 6.6% in the kidneys, 5.2% in the spleen and 0.3%, 0.1% and 0.07% in the bile, gall bladder and muscle respectively. Percentages specified for skin and muscle were for tissue aliquots taken at the dose site. In all other cases, the percentage figures indicated relate to the entire organ.

At 72 hours, 4 ml. of additional vehicle was applied to the dose site and the site washed 2 hours later to remove any remaining drug on the skin surface.

During the 72 hour period preceding the additional vehicle application and washing procedure, it was found that approximately 3% (60$\gamma$) of the dose had penetrated the skin based on radiometric analyses of excreta. Following the application of additional vehicle, the average daily quantity found in the excreta increased from 20$\gamma$ per day to approximately 37$\gamma$ per day over the following 6 days. A peak output of 60$\gamma$ was found on the fifth day following the above procedure.

The cure as shown in Col. 4 clearly demonstrates the dramatic effect that is achieved by the application of additional methyl salicylate vehicle (without vitamin $B_{12}$) to the dose site. It is apparent that the methyl salicylate vehicle was highly effective in causing the vitamin $B_{12}$, which at the end of the three days would otherwise remain merely on the surface of the skin, to penetrate the skin and be absorbed into the body in increasing amounts.

The dog employed in the experiment was an adult female beagle with a body weight of 10.4 kg. The animal's daily ration consisted of 23½ ounces of commercially available dog food with water ad libitum.

The test formulation was prepared as follows: the entire volume of radioactive vitamin $B_{12}$ was evaporated and resultant crystals were disolved in 4.2 ml. of the specified vehicle which also contained carrier vitamin $B_{12}$ at a concentration of 500$\gamma$/ml. The dose applied topically in the dog was 2.051 mg. per 4.1 cc.

The dose site was located in the dog's back approximately 6 inches posterior to the clavicle and measured 6 cm. in diameter. Prior to applying the dose, the hair was carefully removed from the dose site with electric clippers and the site washed with a mild soap solution, rinsed and dried.

Blood samples were withdrawn at specified time intervals for plasma level determinations. Plasma volume and total blood volume were determined by the Evans Blue method. Total urine and feces collections were made on a daily basis. Prior to terminating the study, the dose site was washed as follows: on day 3 with soap solution (10× 20 cc. washes) and on day 13 (3× 10 cc. washes). Additional vehicle (without drug) was applied to the dose site as follows: at 6 hours (1 cc.), on day 3 (4 cc.) and on day 13 (5 cc.). At termination, skin from the site of application was excised and washed in detergent solution (5× 30 cc.). A gross examination was made of the internal organs and the following tissues were taken for radiometric analyses: liver, kidneys, spleen, intestines, skin, muscle, bile, and gall bladder. Radiometric measurements were also made on all plasma samples, excretion collections and washes as indicated.

Results are presented in the following tables and figures.

TABLE 1

Percutaneous absorption of vitamin $B_{12}$-$Co^{57}$ following topical application in the dog

| | |
|---|---:|
| Weight, kg. | 10.4 |
| Drug | (1) |
| Dose of $B_{12}$ applied to skin, mg. | 2.05 |
| Vehicle: | |
|   Dimethylsulfoxide, percent | 10 |
|   Methyl salicylate, percent | 20 |
|   Ethyl alcohol, percent | 70 |
| Percutaneous absorption: | |
|   Urine: | |
|     Percent | 2.8 |
|     Gamma | 57.01 |
|   Feces: | |
|     Percent | 13.9 |
|     Gamma | 284.33 |
|   Tissues: | |
|     Percent | 0.87 |
|     Gamma | 17.96 |
|   Total: | |
|     Percent | 17.5 |
|     Gamma | 359.3 |

[1] Vitamin $B_{12}$-$Co^{57}$.

TABLE 2

Percutaneous absorption of vitamin $B_{12}$-$Co^{57}$ following topical application in the dog

| | |
|---|---:|
| Weight, kg. | 10.4 |
| Drug | (1) |
| Dose applied to skin, mg. | 2.05 |
| Vehicle: | |
|   Dimethylsulfoxide, percent | 10 |
|   Methyl salicylate, percent | 20 |
|   ETOH, percent | 70 |
| Drug found in urine and feces: | |
| Day 1: | |
|   Percent | 0.68 |
|   Gamma | 13.95 |
| Day 2: | |
|   Percent | 1.24 |
|   Gamma | 25.37 |
| Day 3: | |
|   Percent | 1.01 |
|   Gamma | 20.68 |
| Day 4: | |
|   Percent | 1.69 |
|   Gamma | 34.63 |
| Day 5: | |
|   Percent | 0.73 |
|   Gamma | 15.07 |
| Day 6: | |
|   Percent | 1.73 |
|   Gamma | 35.59 |

TABLE 2—Continued

| | |
|---|---:|
| Drug found in urine and feces: | |
| Day 7: | |
|   Percent | 1.43 |
|   Gamma | 29.25 |
| Day 8: | |
|   Percent | 2.97 |
|   Gamma | 60.92 |
| Day 9: | |
|   Percent | 2.17 |
|   Gamma | 44 |
| Day 10: | |
|   Percent | 0.73 |
|   Gamma | 15.04 |
| Day 11: | |
|   Percent | 0.43 |
|   Gamma | 8.74 |
| Day 12: | |
|   Percent | 0.63 |
|   Gamma | 12.90 |
| Day 13: | |
|   Percent | 0.51 |
|   Gamma | 10.39 |
| Day 14: | |
|   Percent | 0.69 |
|   Gamma | 14.24 |
| Total: | |
|   Percent | 16.64 |
|   Gamma | 341.34 |

[1] Vitamin $B_{12}$-$Co^{57}$.

NOTE.—83.3% of the drug excreted was found in the feces, 16.7% in the urine. 4 ml. additional vehicle applied to dose site on Day 3 and site washed with soap solution (10×22 cc. washes) 2 hours later.

TABLE 3

[Vitamin $B_{12}$-$Co^{57}$ found in body tissues following topical application in the dog]

| Tissue | Organ/tissue, wt.-gm. | Percutaneous absorption (body organs) | | |
|---|---:|---:|---:|---:|
| | | Percent | $\gamma$ | $\gamma$/gm. tissue |
| Skin (dose site) | 10.33 | 0.6 | 1.23 | 0.12 |
| Muscle (dose site) | 5.42 | 0.0006 | 0.013 | 0.002 |
| Liver | 323.00 | 0.56 | 11.59 | 0.03 |
| Bile | [1] 13.00 | 0.003 | 0.06 | 0.005 |
| Gall Bladder | 2.83 | 0.0009 | 0.018 | 0.006 |
| Kidneys | 60.00 | 0.06 | 1.19 | 0.02 |
| Spleen | 57.00 | 0.04 | 0.93 | 0.016 |
| Intestines | 435.00 | 0.14 | 2.93 | 0.007 |
| Totals | | 0.87 | 17.96 | |

[1] Ml.

NOTE.—Animal sacrificed 14 days after treatment.

FIGURE 1

[Vitamin $B_{12}$-$Co^{57}$ found in body tissues following topical application in the dog]

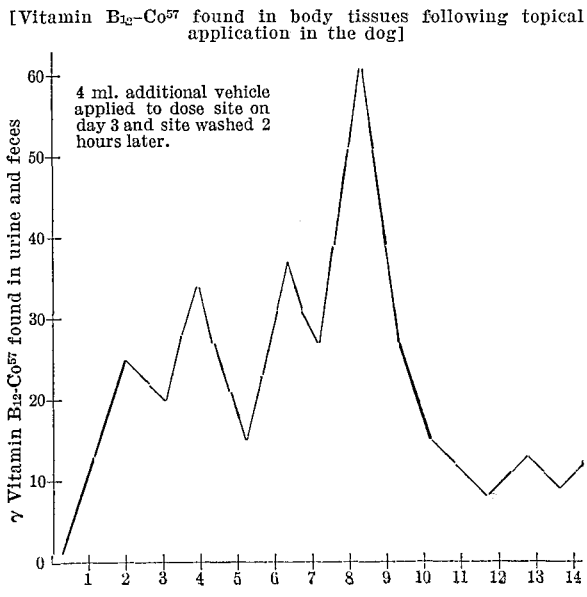

4 ml. additional vehicle applied to dose site on day 3 and site washed 2 hours later.

What is claimed is:

1. The method of administering vitamin $B_{12}$ which comprises applying a formulation comprising vitamin $B_{12}$ and methyl salicylate to the skin.

2. A composition for topical application comprising vitamin $B_{12}$ and methyl salicylate.

References Cited

FOREIGN PATENTS 644,613   3/1964   Belgium.

OTHER REFERENCES

Schaefer et al.: Jl. Nutr., 59(2):171–179, June 1956, "Absorption of Topically Applied Vitamins."

Okuda et al.: Proc. Soc. Exp. Biol. Med., 123(2):504–506, November 1966, "Absorption of Vitamin $B_{12}$ in a Rectal Suppository."

Monto et al.: Arch. Int. Med., 93:219–230 (1954), "Nasal Instillation and Inhalation of Crystalline Vitamin $B_{12}$ in Pernicious Anemia."

SHEP K. ROSE, Primary Examiner